United States Patent [19]

Beers

[11] Patent Number: 5,007,008
[45] Date of Patent: Apr. 9, 1991

[54] METHOD AND APPARATUS FOR SELECTING KEY ACTION

[75] Inventor: Theodore W. Beers, Corvallis, Oreg.
[73] Assignee: Hewlett-Packard Company, Palo Alto, Calif.
[21] Appl. No.: 569,269
[22] Filed: Aug. 17, 1990

Related U.S. Application Data

[63] Continuation of Ser. No. 285,834, Dec. 15, 1988, abandoned.
[51] Int. Cl.⁵ .................................................. G06F 3/00
[52] U.S. Cl. ......................... 364/709.15; 364/709.16; 341/22
[58] Field of Search ....................... 364/709.12, 709.15, 364/709.16, 705.01, 705.02, 705.03, 705.07; 341/22-24; 368/224-225; 400/485

[56] References Cited

U.S. PATENT DOCUMENTS

| | | | |
|---|---|---|---|
| 4,202,038 | 5/1980 | Petersson | 341/24 |
| 4,232,382 | 10/1980 | Heinsen et al. | 364/705.07 X |
| 4,300,204 | 11/1981 | Maeda et al. | 364/705.07 |
| 4,362,392 | 12/1982 | Kumata | 364/705.07 X |
| 4,486,741 | 12/1984 | Nozawa et al. | 364/709.15 X |
| 4,823,311 | 4/1989 | Hunter et al. | 364/709.14 X |

OTHER PUBLICATIONS

"Macintosh 512K enhanced", 1986 Apple Computer, Inc., pp. 19-20 and 54.

Primary Examiner—Dale M. Shaw
Assistant Examiner—Tan V. Mai

[57] ABSTRACT

To reduce the number of keys on a calculator keyboard (22), two symbols representing possible operations or key actions are associated with each key (24) of a plurality of keys. The calculator (20) is programmed (30) to determine which key action is selected to be performed. The symbol representing the selected key action may be displayed on a display screen (28) if appropriate. The program (30) determines which key action is selected in response to a predetermined pattern of pressing a key (24) during a pending period that begins with the initial press of the key (24). The user may adjust the length of the pending period. The presence of the pending period is indicated on the calculator display screen (28) by a cursor (61). Alpha characters may thus be entered into the calculator (20) without the need for an additional keyboard or calculator modes.

11 Claims, 3 Drawing Sheets

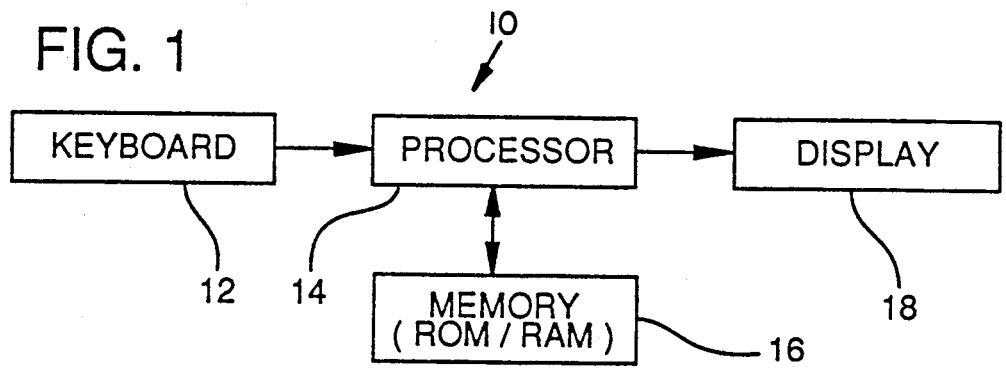
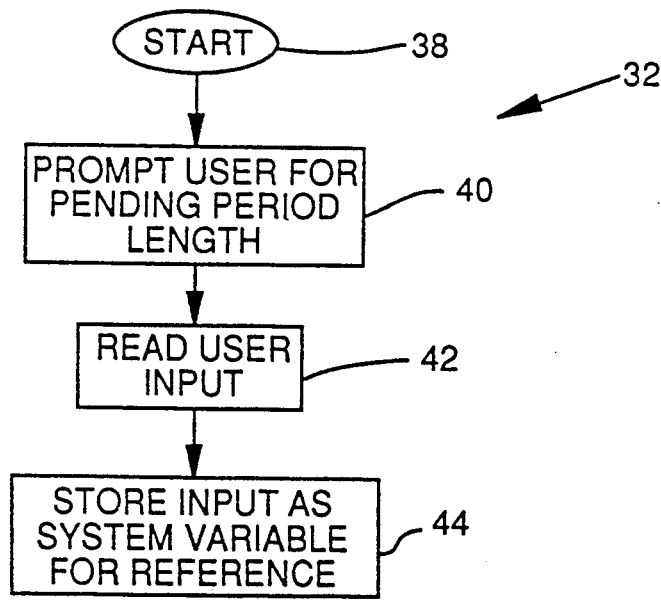

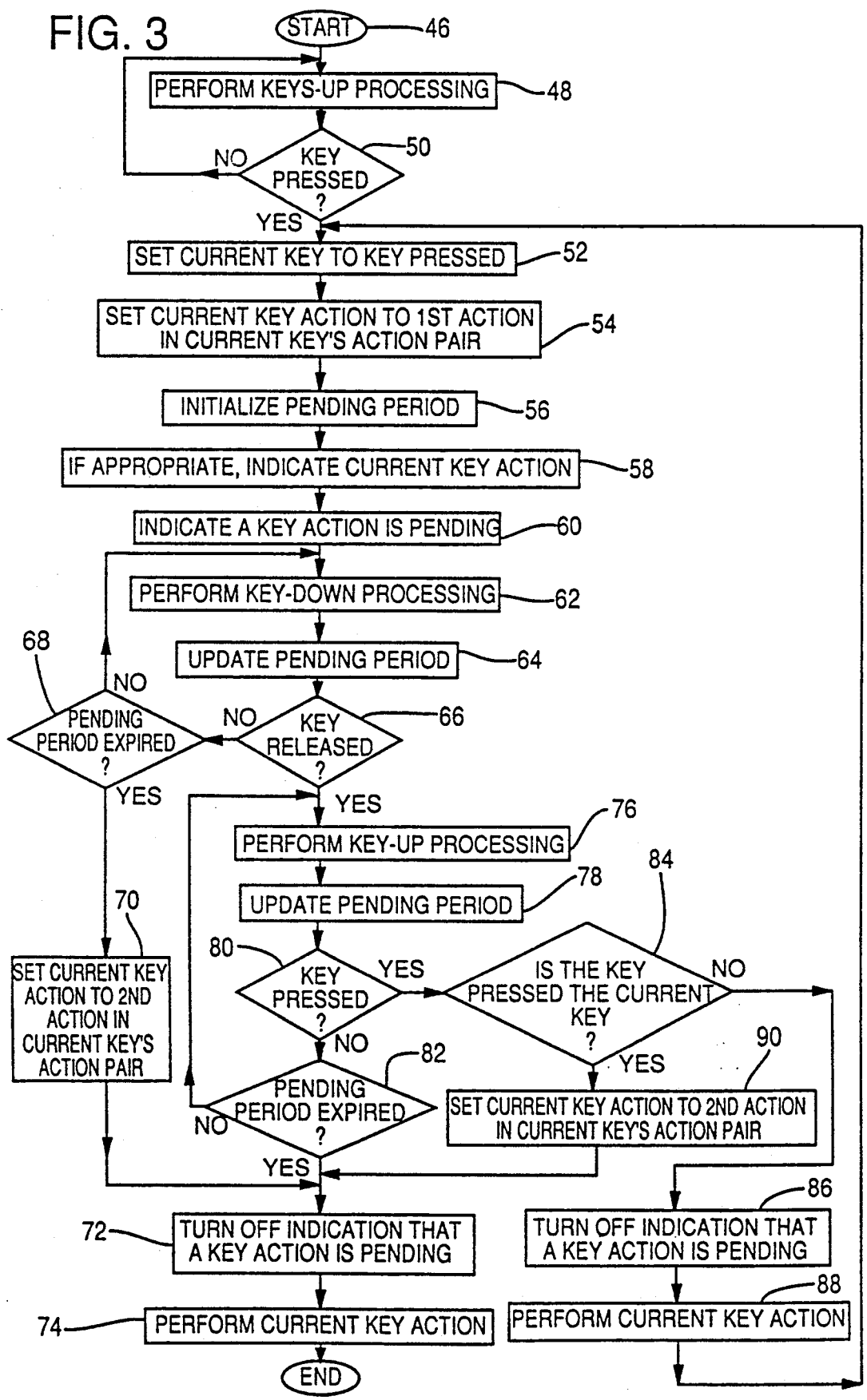

METHOD AND APPARATUS FOR SELECTING KEY ACTION

This application is a continuation of application Ser. No. 07/285,834, filed Dec. 15, 1988, now abandoned.

BACKGROUND OF THE INVENTION

This invention relates to execution of operations from a keyboard. More particularly, this invention relates to method and apparatus for determining which of a number of operations, functions, or other actions associated with a key is to be executed upon pressing of the key.

Electronic keyboards have traditionally assigned one symbol such as a letter mathematical function, numeral, or operator (+,−, etc.) to each key. The symbol represents an operation that is performed when the key is pressed. In the portable calculator environment, however, space is limited and a single symbol-to-key assignment is impractical. One solution is the use of a shift or modifier key. With multiple shift keys, each shift key is a different color and represents a set of symbols that are similarly colored, one symbol of each color adjacent each key. By pressing a blue shift key, for example, a user shifts a key's function to that of the adjacent blue symbol. A number of shift keys may be included in the keyboard and each key is thus associated with a number of functions. An example of a calculator employing shift keys is the Hewlett-Packard 15C.

Some portable calculators include keys labeled with alpha characters such as A, B, etc., for entering names, equations, and programs into the calculator. Methods for entering alpha characters by shifting to an "alpha mode" have been employed in prior calculators such as the Hewlett-Packard 41C. However, entering data with this technique has a number of drawbacks. For one, it requires frequent shifting between the alpha mode and other function modes because many of the functions which may also be entered share a key with an alpha character. For example, the letter A may share a key with other operations such as a cosine function or menu key assignment. Another drawback is finding the desired key on the keyboard. If more than a few symbols are associated with a key, one cannot discern with a glance which symbol is associated with each key. Both these drawbacks affect the speed and accuracy of entering data.

A variation on the shift technique is to assign several characters to a key, such as the letters A, B, and C. A character is then selected by shifting to this mode, pressing the key once, twice, or three times and pressing the enter key to confirm the entry.

One alternative is the provision of a separate alpha keyboard on a second face of a hinged calculator. Although adequate, such a calculator necessarily is larger than desirable for a hand-held calculator. Furthermore, the placement of the alpha keyboard on the second face remote from the display screen delays character entry. The user must glance first to the keyboard and then to the display screen in entering each character.

Another alternative is the "soft alpha" technique. In this technique, the alpha mode is entered by pressing a mode key to display groups of letters on the display screen above a set of unlabeled menu keys. The menu key corresponding to a group of letters that contains the desired letter is then pressed to associate one of each letters with a menu key. Pressing the menu key that corresponds to the desired letter then enters that letter. If the menu key for the group differs from the key for the single letter, the user must press two different keys to enter a letter. The primary drawback of "soft alpha" is the need to press different keys in sequence to enter a symbol such as an alpha character or a function. And while the "soft alpha" technique does not burden the nonmenu keys, it does require shifting between modes to access other menu key assignments.

SUMMARY OF THE INVENTION

An object of the invention, therefore, is an improved method and apparatus for reducing the number of keys required to execute operations from a keyboard.

Another object of the invention is to provide such method and apparatus in which only a single key need be pressed in order to select one of a number of key actions.

In accordance with these objects, such apparatus comprises a plurality of pressable keys for selecting key actions, each key of the plurality having at least two possible key actions and symbols representing each action, and means for determining which of the key actions is selected to be performed. Such means may comprise a program within the apparatus responsive to a predetermined pattern of pressing a key during a pending time period that begins with an initial press of the key. The program may respond to patterns such as the number of key presses within the pending period. For example, if the key is not pressed again in the pending period, one of the key actions is executed. If the key is pressed again within the period, the other key action is executed. Other predetermined patterns are also possible, such as the duration of the initial key press. For example, which key action is executed may depend on whether the duration of the initial key press exceeds the pending period. Key actions that may be performed include executing a function, displaying a symbol, or other desired operations.

To assist the user, the program may display one of the associated symbols after the initial key press to indicate which key action will be performed if a predetermined key pressing pattern is not detected during the pending period. The program may also include means for indicating the presence of the pending period. Such means may control the appearance of the cursor to indicate the presence or absence of the pending period. The user can thus determine from the displayed symbol which operation will be executed and whether he has time to change to the other operation.

To accommodate different users of such keys, the program may include means for allowing the user to adjust the length of the pending period to his proficiency.

The foregoing and other objects, features, and advantages of the invention will become more apparent from the following detailed description of a preferred embodiment which proceeds with reference to the accompanying drawings.

BRIEF DESCRIPTION OF THE DRAWINGS

FIG. 1 is a block diagram of a conventional computer or calculator system.

FIG. 3 is a flowchart that illustrates the programmed operation of the invention.

FIG. 4 is a flowchart that illustrates further programmed operation of the invention.

DETAILED DESCRIPTION

Figure 2:
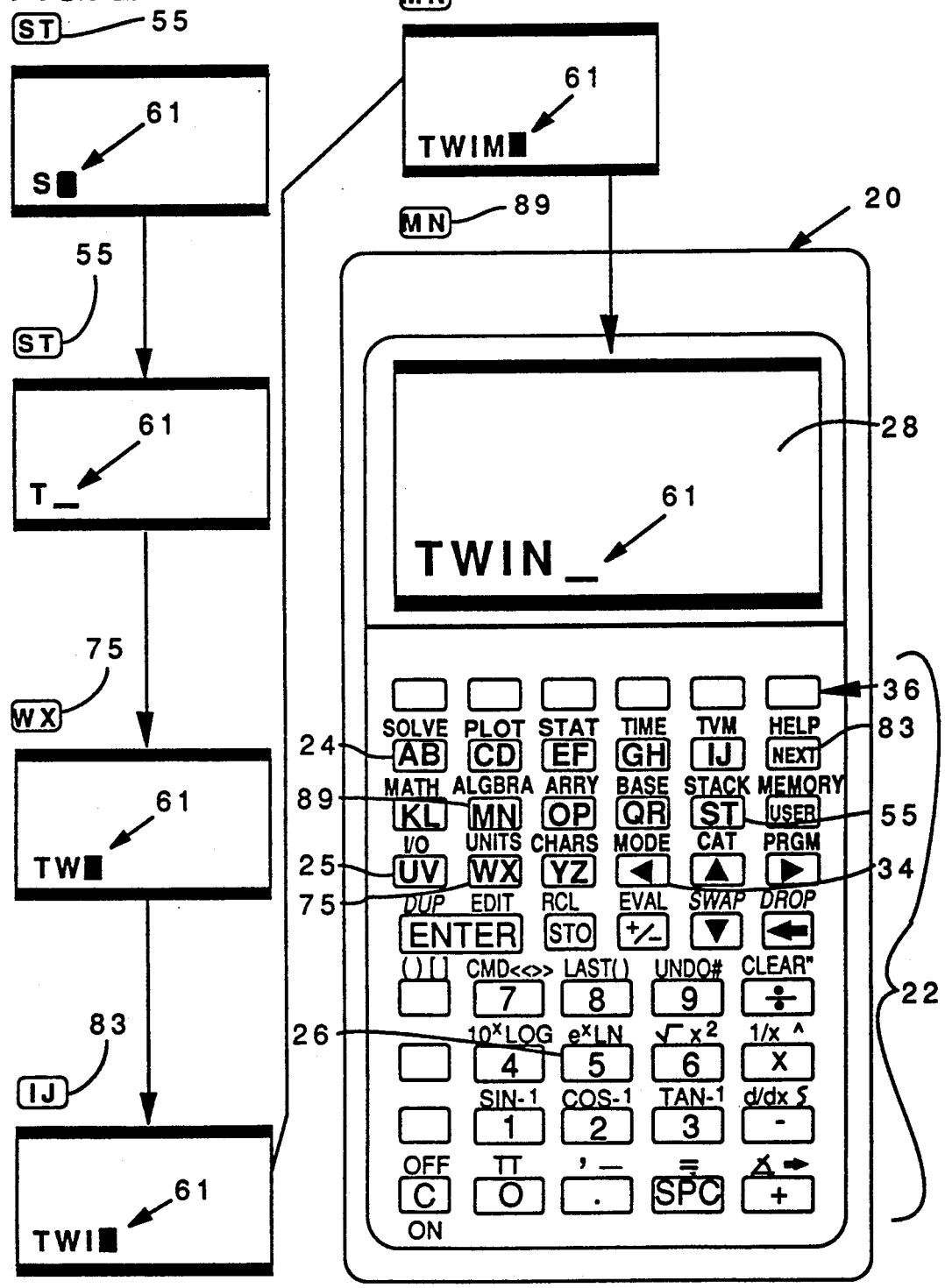
FIG. 2 is a front view of a calculator according to the present invention, including a series of screen displays illustrating the operation of the invention.

Referring now to the drawings, FIG. 1 is a block diagram of a conventional computer system 10 employed by computing devices such as calculators. This system includes an electronic keyboard 12 that communicates with a processing means such as a CPU or microprocessor 14 to transmit operations to be performed, such as alpha character and number entry, and functions (cosine, sine, exponential, etc.). The microprocessor 14 communicates with memory 16 in which is stored computer programs for operating the computer system and for carrying out applications. Memory 16 may include either or both RAM (random access memory) and ROM (read only memory), depending upon the nature of the system. The output of the microprocessor 14 is transmitted to an output device such as the display device 18. Examples of such devices include a video terminal or an LED or LCD screen in a calculator.

FIG. 2 is a front view of a calculator 20 incorporating apparatus and method according to the invention. On a keyboard 22 are a plurality of pressable keys for symbol entry such as alpha character entry for programming. Each key of the plurality is associated with a symbol pair, each symbol representing a distinct key action; for example, the letters A and B are associated with key 24; the letters U and V are associated with key 25; and the $e^x$ (exponential) and the LN (natural log) are associated with key 26. Also in FIG. 2 is a series of screen displays to be described that illustrate how the symbols in each symbol pair may be displayed upon selection of their key action on an associated output device such as display screen 28.

FIG. 3 is a flowchart of a program 30 that controls the operation of the calculator system 10 according to the invention. A computer program such as listed in Appendix A is one possible implementation of the program 30, which is resident in memory 16. The flowchart of FIG. 3, however, is more general and inclusive than the program listed in Appendix A, which is provided only as an example and not as a limitation.

The program 30 determines which of the two key actions is selected and its representative symbol (if appropriate) is displayed in response to pressing the associated key. Within the program 30 are means responsive to a predetermined pattern of pressing a key for determining from the pattern which key action is to be executed. This determination is made during a pending time period that begins with an initial press of the key. It should be readily appreciated by those skilled in the art that the program represented by this flowchart could be embodied in equivalent hardware if desired.

As also will be evident from the following example, a number of other means are provided that enhance the key action selection technique. One is a means for adjusting the length of the pending period for entering a pattern to accommodate the reaction speed of the user. This method is illustrated in FIG. 4 and will be described below in the operation of the apparatus. Briefly, though, a default period of one-half second time is provided by the program. The user may shorten or lengthen this period as need be. Typically, a user would shorten the period as his proficiency improves to increase the rate at which he can enter data.

The program 30 further provides means for indicating on the calculator display screen 28 the presence of the pending period. From such indicia, the user can determine what key action he must take to select the desired key action. In the present embodiment, such means controls the appearance of the cursor to indicate the pending period's presence. An unblinking cursor indicates the presence of a pending period and that another press of the same key will select the key action represented by the second symbol of the pair. A blinking cursor indicates the period has expired and that another key press will select the key action represented by the first symbol of a symbol pair and initiate another pending period. Other indicia are, of course, possible such as a question mark-explanation point pair.

The program 30 further assists the user by temporarily displaying the first symbol of the symbol pair during the pending period to indicate the first key action has been selected, as mentioned above. If key 24 is initially pressed, for example, the letter A is temporarily displayed. This temporary display enables the user to determine whether further pressing of key 24 is necessary to enter the letter A. If the desired key action is entry of the letter A, the user proceeds to the next key or lets the pending period expire before following with another initial press. In either case the selected key action is then performed. If the desired key action is entry of the letter B, on the other hand, the user presses the key 24 in the required pattern and that key action is performed.

The predetermined patterns may be of several kinds, preferably simple for easy recall by the user. In FIG. 3, two patterns are illustrated that may be detected by the program 30. One pattern comprises the number of key presses within the pending period, specifically a single key press. If the same key is pressed within the period, the second key action is selected and performed. If the same key is not pressed within the period, the first key action (already selected) is performed.

The second pattern comprises the duration of the initial key press. If the key press duration exceeds the pending period, the second key action is selected and performed. If the duration does not exceed the period, the first key action is performed. Other patterns, of course, are possible and in programmable calculators the user may create a program that responds to these patterns.

Operation of the program may best be understood by example, with each step identified in the flowcharts of FIGS. 3 and 4 by a numeral in parenthesis. FIG. 4 illustrates the steps in a second program 32 that prompts a user who desires to change the length of the pending period from the default setting. This program is independent from the first program 30 and is started (38) by pressing a mode key 34 on keyboard 22. Pressing key 34 brings up a menu of labels above unlabeled label keys 36. Use of a mode key and associated menu keys is known and employed in calculators such as the Hewlett-Packard 28S scientific calculator. Labels (not shown) appear above each menu key, one of which prompts (40) the user for the desired length of the pending period in seconds or fractions thereof. The user enters the desired length by pressing the appropriate numeric key and decimal point key and the program 32 reads the entry (42). It then stores the entry as a system variable (44) for reference by the program 30. The pending period is now set until the user chooses again to change it.

Referring now to FIGS. 2 and 3, assume the user desires to enter the term TWIN. The program 30 begins execution (46) on powering up of the calculator 20.

Along with program 30, the microprocessor 14 performs other, unrelated keys-up processing routines (48) required for the calculator's operation. The program then enters a first loop. A current input line (initially empty) is displayed on the display screen 28 and key presses are interpreted (50).

If a key associated with a symbol pair is pressed, the "current" key is set to the key pressed (52). The program then sets or selects the first key action of the current key's action pair, represented by the first symbol in the symbol pair (54). For example, in the first screen display of FIG. 2, the current key variable is set to key 55, which has the symbol pair of letter S and T. The selected key action represented by the letter S, the first symbol, is to enter the letter into the calculator 20. The pending period is initialized (56), and the letter S is also temporarily displayed (58). The key action, however, is not yet performed but is indicated as pending (60) during the pending period by the unblinking cursor 61. The step (58) may not occur in some circumstances where display of a symbol is inappropriate such as the key action is a mathematical function performed on data in the display screen. The step (60) may also employ other indicating means, such as an audio indicator to the user.

The program 30 then enters a second loop while waiting for a response from the user. The microprocessor 14 performs key-down processing (62) and then returns to update the pending period (64) before determining if the pressed key has been released (66). If the key is still pressed, the program checks if the pending period has expired (68). If not, the program loops back and continues to look for a key release.

In the second screen display of FIG. 2, the letter T has replaced S. This may have occurred from the duration of the initial key press exceeding the pending period (68) or from releasing the key (66) and pressing it again within the pending period. Assume the first possibility occurred. The second key action is then selected, which is entry of the letter T (70). The action of cursor 61 changes from unblinking to blinking (72). The program 30 then performs the selected second key action (74) by entering the letter T.

Starting again (46), the letter W from key 75, shown in the third screen display, is displayed in the same manner as the letter S. However, here key 75 is released before the period expires (66). The program 30 now enters a third loop while waiting for another response from the user. In this loop, the microprocessor 14 performs keys-up processing (76), then returns to update the pending period (78), check for a key press (80), and check if the pending period has expired (82).

As shown in the fourth screen display, key 83 is pressed (80) before the period expires and the letter I is displayed. In pressing key 83, the program determines that key 83 (with which the letter I is associated) is not the current key 75 (with which the letter W is associated) (84). The unblinking cursor is therefore extinguished (86), and the first key action is performed by entering the letter W. W also continues to be displayed. The program then loops back to set the current key to the key 83 and temporarily displays the letter I in the manner of letters S and W, with the pending period begun again and the unblinking cursor 61 present.

The fifth and sixth screen displays illustrate the display and entry of the letters M and N associated with key 89. The letter M is temporarily displayed (58) as the first symbol in the symbol pair in the manner that the letter I followed the letter W (80-88). The current key is set to key 89 and the selected key action is entry of the letter M. But M is replaced by the letter N. Assume this occurred because key 89 was pressed again within the pending period (80). Since key 89 is the current key (84), the selected key action is switched to entry of the letter N (90). The unblinking cursor begins to blink, indicating termination of the pending period (72), and the letter N is then entered as the second key action is performed. The program then returns to its start (48) to await another key press.

Having illustrated and described the principles of the invention in a preferred embodiment, it should be apparent to those skilled in the art that the invention can be modified in arrangement and detail without departing from such principles. For example, the illustrated embodiment is that of a calculator, but the invention could as well be incorporated into a lap-top or other portable computer. The key actions could also be any other function or operation executable by a key. I claim all modifications coming within the spirit and scope of the following claims.

APPENDIX

| APPENDIX |
|---|
| ** Initialize the program parameters that define the input line and |
| *** the mapping of HP-71 keys to Twin Alpha keys. |
| 10 DIM L$[100] @ DIM M1$[100] @ DIM M2$[100] |
| 20 L$="" |
| 30 M1$=" W E R T Y S D F G H X C V + − * / ( ) 1 2 3 4 5 6 7 8 9 0 . =" |
| 40 M2$=" ABCDEFGHIJKLMNOPQRSTWXYZ+ + − − **//(())11223344556677889900.. = =" |
| *** Prompt for the user-specified maximum pending period, interpreted |
| *** as a maximum wait loop count. |
| 50 INPUT "Pending Period=","2";R |
| *** For the first display, indicate the pending period has expired. |
| 60 C=0 @ GOTO 80 |
|     *** Start of the main loop: |
|     *** Initialize the pending period to the maximum pending period. |
|     70 C=R |
|     ** Start of the wait loop: |
|     *** Update the pending period. |
|     80 C=C−1 |
|     *** If the pending period has not expired, display the input line |
|     *** and the pending character indicator, which is an unblinking |
|     *** cursor. |
|     90 IF C>0 THEN 130 |
|     *** Display the input line and a blinking cursor. |
|     100 IF MOD(C,8)<4 THEN DISP L$&CHR$(31) ELSE DISP L$&" " |
|     110 GOTO 150 |

APPENDIX

```
*** Display the input line--including the pending character unless
*** it was justr selected--and an unblinking cursor.
130 IF C<R-1 THEN DISP L$&CHR$(31) ELSE DISP L$[1,LEN(L$)-1]&CHR$(31)
*** Check for a key press and release.
150 K$=KEY$
*** If no key has been pressed then loop.
160 IF K$="" THEN GOTO 80
*** If the key is f-shifted, convert it into an unshifted key.
170 IF K$[1,1]="f" THEN K$=K$[2,2]
*** Convert the HP-71 key into the first character in this key's
*** character pair.
180 I=POS(M1$,K$)
*** If the HP-71 key has no Twin Alpha mapping then delete the last
*** character in the input line, indicate the pending period has
*** expired, and loop.
190 IF I=0 THEN L$=L$[1,LEN(L$)-1] @ C=-6 @ GOTO 80
*** Get the first character in the key's character pair.
200 K1$=M2$[I, I]
210 L1$=L$[LE(L$),LEN(L$)]
*** If this key is the same as the last key and the pending Period
*** has not expired, then change the pending last character in the
*** input line to the second character in this key's character pair,
*** indicate the pending period has expired, and loop.
220 IF K1$=L1$ AND C0 THEN L$=L$[1,LEN(L$)-1]&M2$[I+1,I+1] @ C=0
   @ GOTO 80
*** If the input line is longer than 15 characters then delete the
*** first ten characters to make room on the display for a new
*** character.
230 IF LEN(L$)>15 THEN L$=L$[11]
** Add the pending character to the input line.
240 L$=L$&K1$
*** Restart the main loop.
250 GOTO 70
```

I claim:

1. Apparatus for selecting key actions to be performed, comprising:
a pressable key for selecting between two key actions associated with the key;
means responsive to a predetermined pattern of pressing the key during a pending time period for determining which of the key actions is selected to be performed, said pending time period beginning with an initial press of the key;
a pair of symbols positioned adjacent to the key, each symbol representing a key action;
a display for displaying a symbol associated with a selected key action; and
means for causing the display to display to first symbol of the pair in response to the initial key press to indicate which key action will be performed if a predetermined key pressing pattern is not detected during the pending period, said means causing the second symbol to be displayed in place of the first if the predetermined pattern is detected during the pending period.

2. The apparatus of claim 1 including user operable adjustment means for adjusting the length of the pending period.

3. The apparatus of claim 1 including an output device and wherein the determining means includes means for indicating on the output device the presence of the pending period.

4. The apparatus of claim 3 in which a cursor is displayed on the display device and the determining means controls the appearance of the cursor to indicate the presence of the pending period.

5. The apparatus of claim 1 wherein the determining means responds to a predetermined pattern comprising the number of key presses within the pending period, the determining means causing a first key action to be performed if the key is not pressed within the period and causing a second key action to be performed if the key is pressed within the period.

6. The apparatus of claim 1 wherein the determining means responds to a predetermined pattern comprising the duration of the initial key press, the determining means causing a first key action to be performed if the key press duration less than the period and causing a second key action to be performed if the duration is greater than the period.

7. Apparatus for symbol entry and display, comprising:
a computing device;
an output device coupled to the computing device for displaying symbols;
a keyboard having a plurality of keys for entering symbols into the computing device and displaying said symbols on the output device, each key of said plurality associated with an adjacent pair of symbols, each symbol representing a key action;
means in communication with the computing device and responsive to a predetermined pattern of pressing a key of said plurality of keys during a pending time period for determining from said pattern which of the associated symbols is to be entered and displayed, said pending period beginning with an initial press of the key; and
means for causing the output device to display a first symbol of a pair in response to the initial press of one of the keys to indicate which key action will be performed if a predetermined key pressing pattern is not detected during the pending period, said means causing the second symbol to be displayed in place of the first if the predetermined pattern is detected during the pending period.

8. A method of selecting key actions to be performed, comprising the following steps:

providing a pressable key for selecting between two key actions, the two actions represented by a pair of symbols adjacent to the key;

determining if the key has been initially pressed;

selecting a first key action upon pressing of the key;

beginning a pending time period upon pressing of the key;

displaying a first symbol in response to the initial key press to indicate which key action will be performed if a predetermined key pressing pattern is not detected during the pending period;

detecting if the predetermined pattern of pressing the key occurs within the pending time period;

selecting a second key action if said pattern is detected; and displaying a second symbol in place of the first if said pattern is detected during the pending period.

9. The method of claim 8 including indicating the presence of the pending period.

10. The method of claim 8 wherein the detecting step comprises detecting if a key press occurs within the pending period.

11. The method of claim 8 wherein the detecting step comprises detecting if the duration of the initial key press exceeds the pending period.

* * * * *